United States Patent
Lewis et al.

(10) Patent No.: US 8,826,270 B1
(45) Date of Patent: Sep. 2, 2014

(54) REGULATING MEMORY BANDWIDTH VIA CPU SCHEDULING

(75) Inventors: William E. Lewis, Bellevue, WA (US); Matt Corddry, Seattle, WA (US); Pradeep Vincent, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 453 days.

(21) Appl. No.: 12/725,006

(22) Filed: Mar. 16, 2010

(51) Int. Cl.
*G06F 9/455* (2006.01)

(52) U.S. Cl.
USPC ............................................. 718/1

(58) Field of Classification Search
None
See application file for complete search history.

(56) References Cited

U.S. PATENT DOCUMENTS

| | | | |
|---|---|---|---|
| 6,434,591 B1 * | 8/2002 | Watakabe et al. | 718/103 |
| 2002/0099753 A1 * | 7/2002 | Hardin et al. | 709/1 |
| 2004/0168005 A1 * | 8/2004 | Civlin | 710/260 |
| 2008/0162972 A1 * | 7/2008 | Liu et al. | 713/324 |
| 2008/0163254 A1 * | 7/2008 | Cota-Robles et al. | 719/318 |
| 2010/0095300 A1 * | 4/2010 | West et al. | 718/104 |
| 2011/0055479 A1 * | 3/2011 | West et al. | 711/118 |

* cited by examiner

*Primary Examiner* — Emerson Puente
*Assistant Examiner* — Sisley Kim
(74) *Attorney, Agent, or Firm* — Hope Baldauff, LLC (57) ABSTRACT

Technologies are described herein for regulating memory bandwidth usage in virtual machines via CPU scheduling. A virtual machine monitor ("VMM") executing on a host computer detects excessive memory bandwidth usage by programs executing in a virtual machine on a processor of the host computer. The VMM may detect excessive memory bandwidth usage by monitoring cache-misses occurring in the processor, for example. Upon detecting excessive memory bandwidth usage, the VMM penalizes the virtual machine currently executing on the processor through the CPU-scheduling algorithm utilized to allocate processor time among the virtual machines.

16 Claims, 4 Drawing Sheets

REGULATING MEMORY BANDWIDTH VIA CPU SCHEDULING

BACKGROUND

Modern multi-core and/or multi-processor computers provide for the execution of multiple software programs concurrently, requiring the hardware resources of the computer to be shared across the executing programs. For example, the processing capabilities provided by the processors of the computing system may be divided among the various programs equally, or may be allocated to each program depending on priority or need. Similarly, the memory of the computing system may be partitioned, with a portion of memory being allocated to each program. Simultaneous attempts by the executing programs to access memory, storage, input/output ("I/O") devices, and other hardware resources may be mediated to allow orderly sharing between the programs. The allocation and mediation of shared resources is traditionally the role of the operating system ("OS") controlling execution of multiple application programs in the computing system.

In a virtualization system, the hardware resources of a host computer are abstracted and presented as one or more individual virtual machines. Each virtual machine may host a separate instance of an OS. A virtual machine monitor ("VMM") executing on the host computer may be responsible for allocating processor time and memory among the virtual machines, and for mediating access to shared resources. The VMM may attempt to fairly allocate limited hardware resources, such as processor time and memory, to each virtual machine to ensure that the OS hosted by each virtual machine performs as desired. However, other limited resources, such as memory bandwidth, may not be allocated among the virtual machines, but utilized on demand by the OSs and applications programs executing within each virtual machine. This may result in the OS and programs executing in one virtual machine "stealing" limited hardware resources from other virtual machines, adversely impacting the performance of the programs executing in the other virtual machines.

It is with respect to these and other considerations that the disclosure made herein is presented.

DETAILED DESCRIPTION

The following detailed description is directed to technologies for regulating memory bandwidth usage in virtual machines via CPU scheduling. As discussed above, while a virtual machine manager ("VMM") may attempt to fairly allocate processor time and memory to each virtual machine on the host computer, other limited resources, such as memory bandwidth, may not be allocated among the virtual machines, but utilized on demand by the programs executing within each virtual machine. This can result in the programs executing in one virtual machine adversely impacting the performance of the programs executing in the other virtual machines.

Utilizing the technologies described herein, a VMM may regulate memory bandwidth usage in the virtual machines by detecting excessive memory bandwidth usage by the programs executing in a particular virtual machine, and penalizing that virtual machine through the CPU-scheduling algorithm utilized to allocate processor time among the virtual machines. Virtual machines hosting operating systems ("OSs") and/or other programs utilizing excessive memory bandwidth will be allocated less processor time, reducing their impact on the programs executing in other virtual machines on the host computer.

According to one embodiment, the VMM monitors cache-misses occurring in each processor of the host computer. On every Nth cache-miss, the VMM penalizes the virtual machine currently executing on the processor, by decrementing its priority or reducing its credits, for example, causing the virtual machine to be allocated less processor time. In another embodiment, the VMM establishes a counter to count cache-misses in each time slice allocated to a virtual machine on a processor. If the number of cache-misses that occur during the execution of the time slice exceeds a specific quota, the virtual machine is penalized, by preemptively ending its execution in the time slice, for example. In this way, virtual machines causing an excessive number of cache-misses, and thus utilizing an excessive amount of memory bandwidth, will receive less and less processor time over time.

It should be appreciated that the subject matter presented herein may be implemented as computer process, a computer-controlled apparatus, a computing system, or an article of manufacture, such as a computer-readable storage medium. These and various other features and embodiments will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
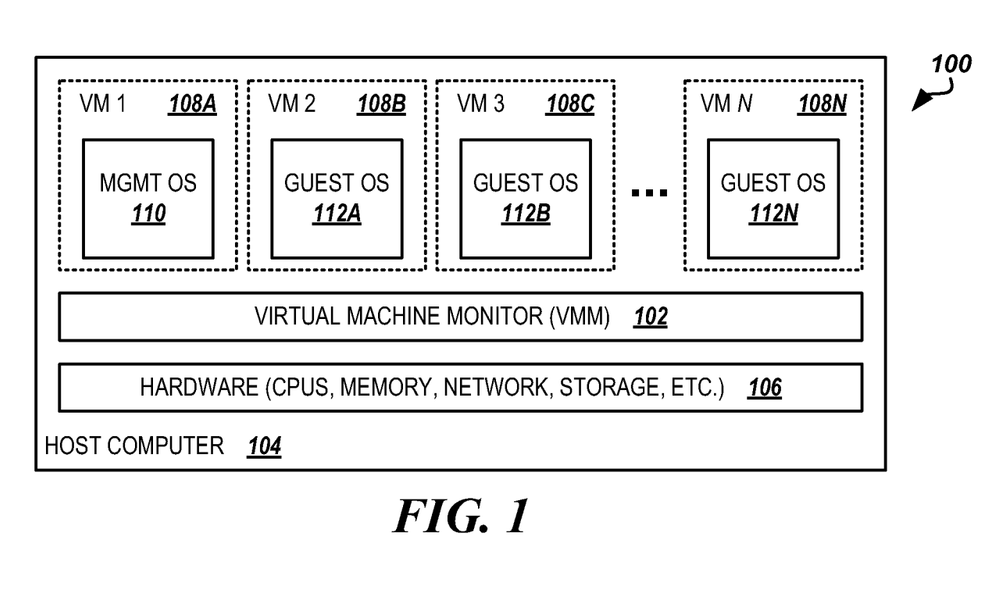
FIG. 1 is a block diagram showing aspects of an illustrative virtualization system, including several software and hardware components provided by embodiments presented herein.

FIG. 1 is a block diagram of an exemplary virtualization architecture 100, according to embodiments. The virtualization architecture 100 includes a VMM 102, also referred to as a hypervisor, that allows multiple operating systems to concurrently execute on a single host computer 104. The VMM 102 abstracts the hardware of the host computer 104 to create one or more virtual machines 108A-108N (referred to herein generally as virtual machine 108). The VMM 102 may be implemented in the hardware of the host computer 104, or it may be implemented as a software module that executes at a low-level in the host computer to provide services to the virtual machines 108.

Each virtual machine 108 may host an instance of an OS. According to one embodiment, one virtual machine 108A hosts a management OS 110. The management OS 110 may be automatically started by the VMM 102 upon startup of the host computer 104, and may provide administrators of the host computer tools and facilities for managing the VMM and the other virtual machines 108B-108N. The virtual machine 108A hosting the management OS 110 may execute at a higher privilege level than the other virtual machines 108B-108N, and the management OS may also provide services to the other virtual machines through the VMM 102, such as loading of hardware drivers for the host computer, marshalling access to shared hardware devices, scheduling shared resources, and the like. The management OS 110 may be a specifically modified version of the LINUX operating system, for example.

The other virtual machines 108B-108N may host guest OSs 112A-112N (referred to herein generally as guest OS 112). According to one embodiment, the VMM 102 may support both paravirtualized and fully-virtualized guest OSs 112. A paravirtualized guest OS 112 is modified to run in a virtual machine 108 provided by the VMM 102, while a fully-virtualized guest OS 112 may be an unmodified version of an operating system that is unaware that it is operating in a virtual machine. Guest OSs 112 may include the MICROSOFT® WINDOWS® operating system from MICROSOFT Corporation of Redmond, Wash., the ORACLE® SOLARIS operating system from ORACLE Corporation of Redwood City, Calif., the LINUX operating system, the UNIX operating system, the NetBSD operating system, and the like.

It will be appreciated that the embodiments described herein are applicable to other virtualization architectures beyond the virtualization architecture 100 described above and shown in FIG. 1. For example, the management OS 110 may run directly above and control access to the hardware resources 106 of the host computer 104. The management OS 110 hosts the VMM 102, which creates and controls a number of virtual machines 108. The virtual machine 108 in-turn host guest OSs 112 that may be managed through the management OS 110 hosting the VMM 102.

According to embodiments, the VMM 102, in conjunction with the management OS 110, controls the allocation and sharing of hardware resources 106 of the host computer 104 amongst the virtual machines 108. The hardware resources 106 may include central processing units ("CPUs") or processors, physical memory, network interfaces, storage devices, input/output ("I/O") controllers, and the like. For example, each virtual machine 108 may be allocated a portion of the physical memory of the host computer 104, depending on the requirements of the hosted guest OS 112 and/or parameters specified by an administrator. The VMM 102 may present the allocated portion of physical memory to each VMM 102 as a contiguous memory address space starting at a virtual address of zero. The VMM 102 may maintain memory-mapping tables to translate virtual memory addresses accessed by the guest OS 112 executing in the virtual machine 108 to actual physical addresses within the allocated portion of memory on the host computer 104. Similarly, the VMM 102, in conjunction with the management OS 110, may control shared access to storage devices, network interfaces, I/O devices, and the like between the virtual machines 108.

The VMM 102 also controls allocation of processing resources to the virtual machines 108. The VMM may divide the processor time of the host computer 104 among the virtual machines 108 based on the requirements of the hosted guest OS 112 and/or parameters specified by an administrator. The VMM 102 may utilize one or more CPU-scheduling algorithms to divide processor time between the virtual machines 108 in order to maximize utilization and throughput while achieving fairness between the guest OSs 112. For example, the VMM 102 may use, singularly or in combination, a borrowed virtual time ("BVT") algorithm, a simple earliest deadline first ("SEDF") algorithm, a round-robin algorithm, a credit-based scheduling algorithm, or any other CPU-scheduling algorithm known in the art to determine the amount of processor time to be allocated to each virtual machine 108.

According to embodiments, the CPU-scheduling algorithm utilized by the VMM 102 depends in-part on a weight or priority assigned to each virtual machine 108. The priority of each virtual machine 108 may be assigned by an administrator of the host computer 104 based on the requirements of the guest OS 112 or application programs executing in the virtual machine, for example. Virtual machines 108 with higher priorities may receive more processor time than virtual machines 108 with lower priorities, and may be allowed to preempt the execution of virtual machines with lower priorities. In one embodiment, each virtual machine 108 may be issued a number of credits for processor time, depending on the requirements of the guest OS 112 executing in the virtual machine or other factors. The amount of processor time allocated to each virtual machine 108 by the CPU-scheduling algorithm may further depend on the number of credits issued to the virtual machine. It will be appreciated that the CPU-scheduling algorithm may use any number of priority, credit, or other weighting mechanisms known in the art, alone or in combination, to determine the amount of processor time to allocate to each virtual machine 108.

Figure 2:
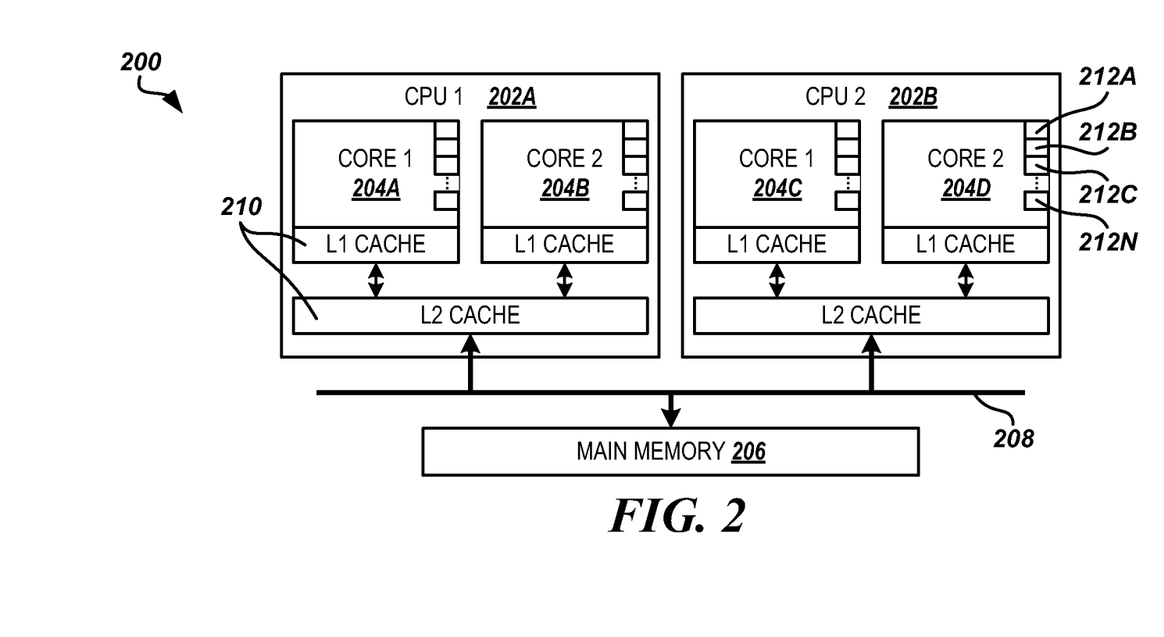
FIG. 2 is a block diagram showing an illustrative memory access architecture in a multi-processor computing system, according to embodiments presented herein.

FIG. 2 is a block diagram of a memory access architecture 200 in a typical multi-processor host computer 104. The host computer 104 may contain one or more CPUs 202A, 202B (referred to herein generally as CPU 202). Each CPU 202 may further contain one or more cores 204A-204D (referred to herein generally as core 204). Each core 204 may be an independent processing unit integrated into the circuitry or packaging of the CPU 202. For example, the host computer 104 may contain one or more quad-core INTEL® XEON® Processor 5000 series CPUs from INTEL Corporation of Santa Clara, Calif., dual-core IBM® POWER6 series CPUs from International Business Machines Corp. of Armonk, N.Y., or any other single-core or multi-core CPUs known in the art.

According to embodiments, the VMM 102 may allocate processor time among the virtual machines 108 by scheduling each virtual machine to execute for a specific period of time on a CPU 202 (or core 204) in succession, based on the priority assigned or credits issued to the virtual machine. The specific time for execution allocated to a virtual machine 108A-108N may be generally referred to as a time slice or quantum. The time slice allocated to each virtual machine 108 may depend on the priority assigned to virtual machine, the number of credits issued to the virtual machine, or other factors based on the CPU-scheduling algorithm utilized by the VMM 102. The VMM 102 may further maintain the order of execution of the virtual machines 102 on the CPUs 202 or cores 204 in a run queue. In this description, the term processor is used interchangeably with the terms core and/or CPU to refer to the independent processing unit upon which execution time is scheduled for the virtual machines 108. It will be appreciated that the VMM 102 may schedule the virtual machines 108 to execute across the cores 204A-204D and/or CPUs 202A, 202B such that multiple virtual machines may be executing instructions on the host computer 104 simultaneously.

The host computer 104 also contains a main memory 206. The cores 204 and CPUs 202 typically read and write instructions and other data from the main memory 206 during execution of software programs running in the virtual machines 108. Each CPU 202 is coupled to the main memory 206 by a memory interface 208. The memory interface 208 may be a data bus, a bridge, a memory bank controller, or any other memory interface mechanism that may be used to interconnect memory and processors. The memory interface 208 may be implemented within each CPU 202, within the main memory 206, or by other circuitry within the host computer 104, such as within a chipset. The memory interface 208 may provide multiple, discrete channels that may be utilized by the cores 204 and/or CPUs 202 to access the main memory 206.

Because processors typically operate at a much faster operating speed than the main memory 206, the cores 204 and CPUs 202 may access the main memory 206 through one or more CPU caches 210. The CPU caches 210 may be implemented in smaller and faster memory than the main memory 206, and may store copies of data and instructions being read from and written to the main memory. For example, each core 204 may utilize a level 1 ("L1") cache embedded within the circuitry of the core. In addition, each CPU 202 may contain a level 2 ("L2") cache that provides additional caching of data from the main memory 206 across the cores 204 of the CPU. It will be appreciated that additional or different levels of caching may be implemented within each core 204, CPU 202, or across the CPUs in host computer 104, beyond the L1 and L2 CPU caches 210 shown in FIG. 2 and described herein.

When a guest OS 112 or other application program executing within a virtual machine 108 requests data from the main memory 206, the CPU 202 upon which the virtual machine is executing may first check the CPU caches 210 to determine if the data is stored in the cache. If the data is not currently cached, the CPU 202 may load a number of blocks of data from the main memory 206 into the CPU caches 210, including the requested data as well as data expected to be requested. This operation is referred to as "prefetching." Similarly, if the program executing in the virtual machine 108 writes data to the main memory 206, the CPU 202 may first write the data to the CPU caches 210. In a CPU 202 that implements a write-back or write-behind cache, the actual write of the data to the main memory 206 may be done asynchronously, allowing the program to continue executing instructions on the CPU without waiting for the data written to the cache to be flushed to the slower main memory 206.

It will be appreciated that the bandwidth of read and write operations from the CPUs 202A, 202B through the memory interface 208 to the main memory 206, referred to as "memory bandwidth," presents a limited resource that must be shared across all virtual machines 108 executing on the host computer 104. Further, programs executing in one virtual machine 108 may monopolize usage of the memory bandwidth, impacting the operation of the other virtual machines executing on the host computer. For example, a guest OS 112 or other application program executing within a virtual machine 108 may read an inordinate amount of random data that, when coupled with prefetching, may fill the CPU caches 210 with data that may be unutilized by other virtual machines 108 executing simultaneously or subsequently on the same CPU 202. Similarly, one virtual machine 108 may pollute the CPU caches 210 by writing a large amount of data to the cache, forcing other virtual machines to wait for the cached data to be flushed to main memory 206 before being allowed to proceed with write operations.

According to embodiments, the VMM 102 implements one or more mechanisms for regulating memory bandwidth usage in the virtual machines 108A-108N executing on the host computer 104, as will be described below in more detail in regard to FIGS. 3 and 4. The VMM 102 may detect overuse of the memory bandwidth by a virtual machine 108, and then penalize the offending virtual machine so that memory bandwidth may be more fairly shared between the virtual machines executing on the host computer 104. The VMM 102 may detect the overuse of memory by monitoring cache-misses in the CPUs 202 of the host computer 104. A cache-miss occurs when the CPU 202 attempts to read instructions or data that are not currently cached in the CPU caches 210 or attempts to write data but must wait until other data in the cache is flushed to main memory 206 before writing the data to the cache.

In one embodiment, the VMM 102 utilizes hardware performance counters 212A-212N located in the CPUs 202 to monitor the cache-misses. The hardware performance counters 212A-212N are special registers that can be programmed to count hardware events, such as clock ticks, instruction counts, cache-misses, and the like, and generate an interrupt after a specified number of events have occurred. One set of hardware performance counters 212A-212N may exist per core 204 in each CPU 202, or the cores of the CPU may share a single set of performance counters. In addition, the hardware performance counters 212A-212N may be virtualized such that the counters maintain event counts individually for each virtual machine 108A-108N executing on the host computer 104.

Figure 3:
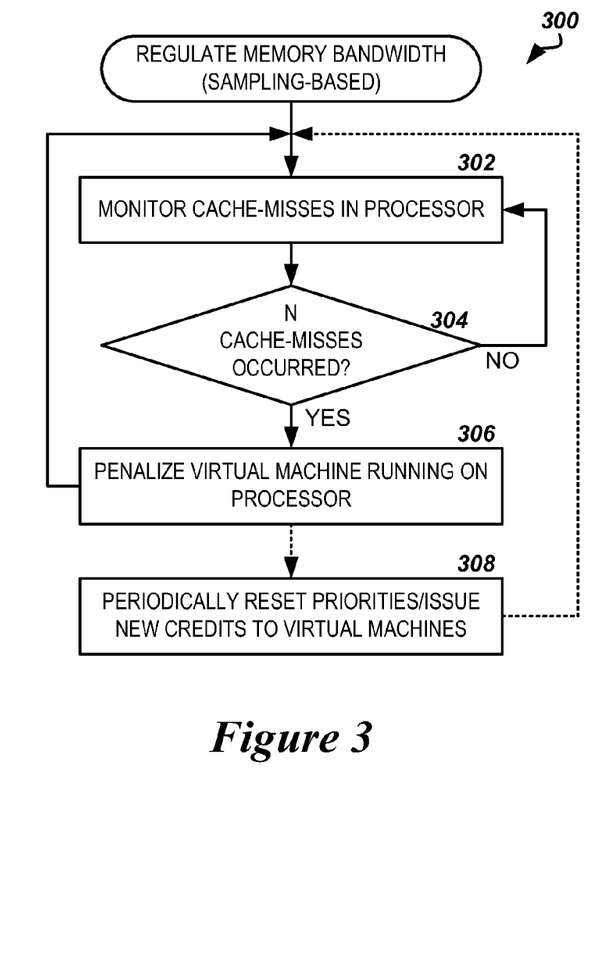
FIG. 3 is a flow diagram showing one method for regulating memory bandwidth usage in virtual machines via central processing unit ("CPU") scheduling, according to embodiments described herein.
Figure 4:
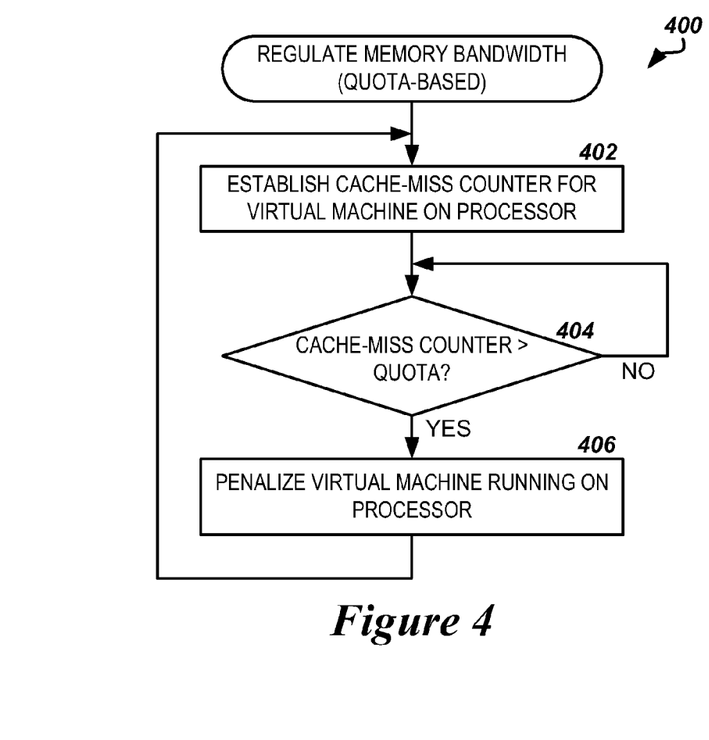
FIG. 4 is a flow diagram showing another method for regulating memory bandwidth usage in virtual machines via CPU scheduling, according to embodiments described herein.

Turning now to FIGS. 3-4, additional details will be provided regarding the embodiments presented herein for regulating memory bandwidth usage in virtual machines via CPU scheduling. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 3 illustrates one routine 300 for regulating memory bandwidth usage in virtual machines utilizing a sampling-based mechanism, according to embodiments described herein. The routine 300 may be performed by the VMM 102, by another module or component of the management OS 110 executing on the host computer 104, or by any combination of modules and components. The routine 300 begins at operation 302, where the VMM 102 monitors the cache-misses in each core 204 of the host computer 104 on which virtual machines 108 may be scheduled for execution. As described above in regard to FIG. 2, the VMM 102 may utilize one or more hardware performance counters 212A-212N to monitor the cache-misses within each core 204. In one embodiment, the VMM 102 may monitor cache-misses in the cache in the processors' cache hierarchy that is closest to the memory interface 208. For example, the VMM 102 may program a hardware performance counter 212A on each core 204 to generate an interrupt after a specific number (N) of L2 cache-misses have occurred in the core, in accordance with the memory access architecture 200 shown in FIG. 2.

The specific number N of cache-misses may be an integer value configured by an administrator of the host computer 104. The value of N may vary depending on the cache line size, main memory bandwidth, the number of cores, the update rate for the CPU scheduler, and other factors or parameters associated with the CPUs 202, the memory access architecture 200, the CPU-scheduling algorithm, and the like. In one embodiment, the value of N may be on the order of tens of thousands of cache-misses between interrupts. In addition, it will be appreciated that the VMM 102 may implement other methods known in the art to monitor the number of cache-misses beyond the use of a hardware performance counter, as described above.

From operation 302, the routine 300 proceeds to operation 304, where the VMM 102 determines if the specific number of cache-misses have occurred on the core 204. For example, the VMM 102 may receive the interrupt generated by the hardware performance counter 212A programmed in operation 302, indicating that N cache-misses have occurred since the last interrupt. If no interrupt is received, i.e. N cache-misses have not occurred in the core 204 since the last interrupt, the routine 300 returns to operation 302, where the VMM 102 continues to monitor cache-misses.

Upon receiving the interrupt indicating that N cache-misses have occurred, the routine proceeds from operation 304 to operation 306, where the VMM 102 penalizes the virtual machine 108 currently executing on the core 204 when the Nth cache-miss occurred. According to one embodiment, the virtual machine 108 is penalized by decrementing the priority assigned to the virtual machine. In another embodiment, the VMM 102 penalizes the currently executing virtual machine 108 by reducing the virtual machine's credits for processor time. Decrementing the priority assigned to the virtual machine 108 or reducing the virtual machine's credits may result in the virtual machine being allocated less processor time by the VMM 102, based on the CPU-scheduling algorithm utilized by the VMM. In this way, virtual machines 108 causing an excessive number of cache-misses, and thus utilizing an excessive amount of memory bandwidth, will receive less and less processor time over time, thereby reducing the adverse impact of the offending virtual machines on the performance of the other virtual machines executing on the host computer 104.

It will be appreciated that the virtual machine 108 currently executing on the core 204 may be penalized by some method other than the reduction of its priority or credits, as described above. For example, the VMM 102 may lower the position of the virtual machine 108 in the run queue, or may preempt the execution of the virtual machine in favor of the next virtual machine according to the CPU-scheduling algorithm. Alternatively, the CPU-scheduling algorithm utilized by the VMM 102 may be configured to take into account the number of cache-misses generated by the virtual machine 108 over a particular duration in determining the amount of processor time allocated to the virtual machine. It is intended that this application include all such methods of penalizing a virtual machine through the CPU-scheduling algorithm utilized by the VMM 102.

From operation 306, the routine 300 returns to operation 302, where the VMM 102 continues monitoring the cache-misses on the cores 204 of the host computer 104 on which virtual machines 108 may be scheduled for execution. It will be appreciated that the VMM 102 may periodically reset the priorities of the virtual machines 108 to their assigned values or issue new credits for processor time to the virtual machines, as further indicated at operation 308 in FIG. 3. This may allow any previously penalized virtual machines 108 to eventually recover their initial weight or position within the CPU-scheduling algorithm.

FIG. 4 illustrates another routine 400 for regulating memory bandwidth usage in virtual machines utilizing a quota-based mechanism, according to further embodiments described herein. The routine 400 may be performed by the VMM 102, by another module or component of the management OS 110 executing on the host computer 104, or by any combination of modules and components. The routine 400 begins at operation 402, where the VMM 102 establishes a cache-miss counter for a virtual machine 108 scheduled to execute in an allocated time slice on a specific core 204 of the host computer 104. The time slice allocated to each virtual machine 108 may depend on the priority assigned to virtual machine 108 and the number of credits issued to the virtual machine, along with other factors considered by the CPU-scheduling algorithm utilized by the VMM 102.

According to one embodiment, the VMM 102 programs a hardware performance counter 212A of the core 204 to count cache-misses during execution of the virtual machine 108 within the allocated time slice and to generate an interrupt when the count of cache-misses exceeds a specific quota value. The quota value of cache-misses may vary by virtual machine 108 depending upon the assigned priority or other requirements of each virtual machine, or the quota value of cache-misses may be the same for all virtual machines executing on the host computer 104. The VMM 102 may further reset the established cache-miss counter before causing the virtual machine 108 to execute on the allocated core 204.

From operation 402, the routine 400 proceeds to operation 404, where the VMM 102 determines if the cache-miss counter has exceeded the quota. For example, the VMM 102 may receive the interrupt generated by the hardware performance counter 212A programmed in operation 402, indicating that the cache-miss counter established for the virtual machine 108 has exceeded the quota value of cache-misses within the allocated time slice. Upon receiving the interrupt indicating that the cache-miss counter has exceeded the established quota, the routine proceeds from operation 404 to operation 406, where the VMM 102 penalizes the virtual machine 108 executing on the core 204.

According to one embodiment, the VMM 102 penalizes the virtual machine 108 executing on the core 204 by preemptively halting its execution within the allocated time slice and continuing to the next scheduled virtual machine 108 in the run queue. By halting the execution of the virtual machine 108 within the time slice when the number of cache-misses exceeds the established quota, a virtual machine 108 causing an excessive number of cache-misses, and thus utilizing an excessive amount of memory bandwidth, will receive less processor time, reducing the adverse impact of the offending virtual machine on the performance of the other virtual machines executing on the host computer 104. This also allows the virtual machine 108 utilizing excessive memory bandwidth to be temporarily penalized without decrementing the virtual machine's priority or reducing its credits.

It will be appreciated that the VMM 102 may penalize the virtual machine 108 by some method other than the preemptive halting of its execution within the allocated time slice, such as by decrementing the virtual machine's priority or reducing its credits as described above in regard to operation 306. Alternatively, if the scheduled time slice for a virtual machine 108 is completed without the established quota of cache misses being exceeded, the VMM 102 may reward the virtual machine by incrementing its priority or issuing new credits for processor time, thus allowing a previously penalized virtual machine 108 to eventually recover its initial weight or position within the CPU-scheduling algorithm. From operation 406, the routine 400 returns to operation 402, where the VMM 102 establishes a cache-miss counter for the next virtual machine 108 scheduled to execute on the core 204, according to the CPU-scheduling algorithm.

It will be further appreciated that the hardware performance counters 212A-212N may be programmed to count other type of hardware events to determine memory bandwidth usage within the host computer 104, beyond the cache-miss events described above. In addition, the counters may be used in a different fashion to adjust the amount of processor time allocated to an offending virtual machine 108 through the CPU-scheduling algorithm utilized by the VMM 102. For example, the hardware performance counters 212A-212N may be virtualized such that the counters count cache-misses or other hardware events on a per virtual machine basis. These counts may then be utilized by the CPU-scheduling algorithm, along with other factors such as priority and network and block I/O usage data, to determine the amount of processor time to be allocated to each virtual machine 108.

In an alternative embodiment, each virtual machine 108 executing on the host computer 104 may be issued both credits for processor time and credits for memory bandwidth usage. The credits for processor time may be consumed as the virtual machine 108 executes the guest OS 110 in each scheduled time slice, while the credits for memory bandwidth usage may be consumed as the virtual machine utilizes memory bandwidth. For example, the VMM 102 may detect memory bandwidth usage by counting the cache-misses generated by a virtual machine 108 in a scheduled time slice and reduce the virtual machine's credits for memory bandwidth usage accordingly. The CPU-scheduling algorithm may consider both the credits for processor time and the credits for memory bandwidth usage in determining the amount of processor time to allocate to each virtual machine 108. In this way, the VMM 102 may fairly allocate the memory bandwidth resource across the virtual machines 108 executing on the host computer 104.

While the methods and routines describe above are presented in the context of regulating memory bandwidth usage among virtual machines 108A-108N executing on a host computer 104, it will be further appreciated that the methods and routines may be utilized to regulate memory bandwidth usage between other types of computer programs executing concurrently on a computer system, such as application programs and the like. Further, the methods and routines described above may be utilized to regulate shared access to other limited hardware resources 106 within the host computer 104. For example, similar sampling-based or quota-based mechanisms may be utilized to regulate PCI bus bandwidth between concurrently executing virtual machines 108 on the host computer 104 or to enforce fair use of the CPU caches 210 across virtual machines in order to avoid cache pollution by one virtual machine.

Figure 5:
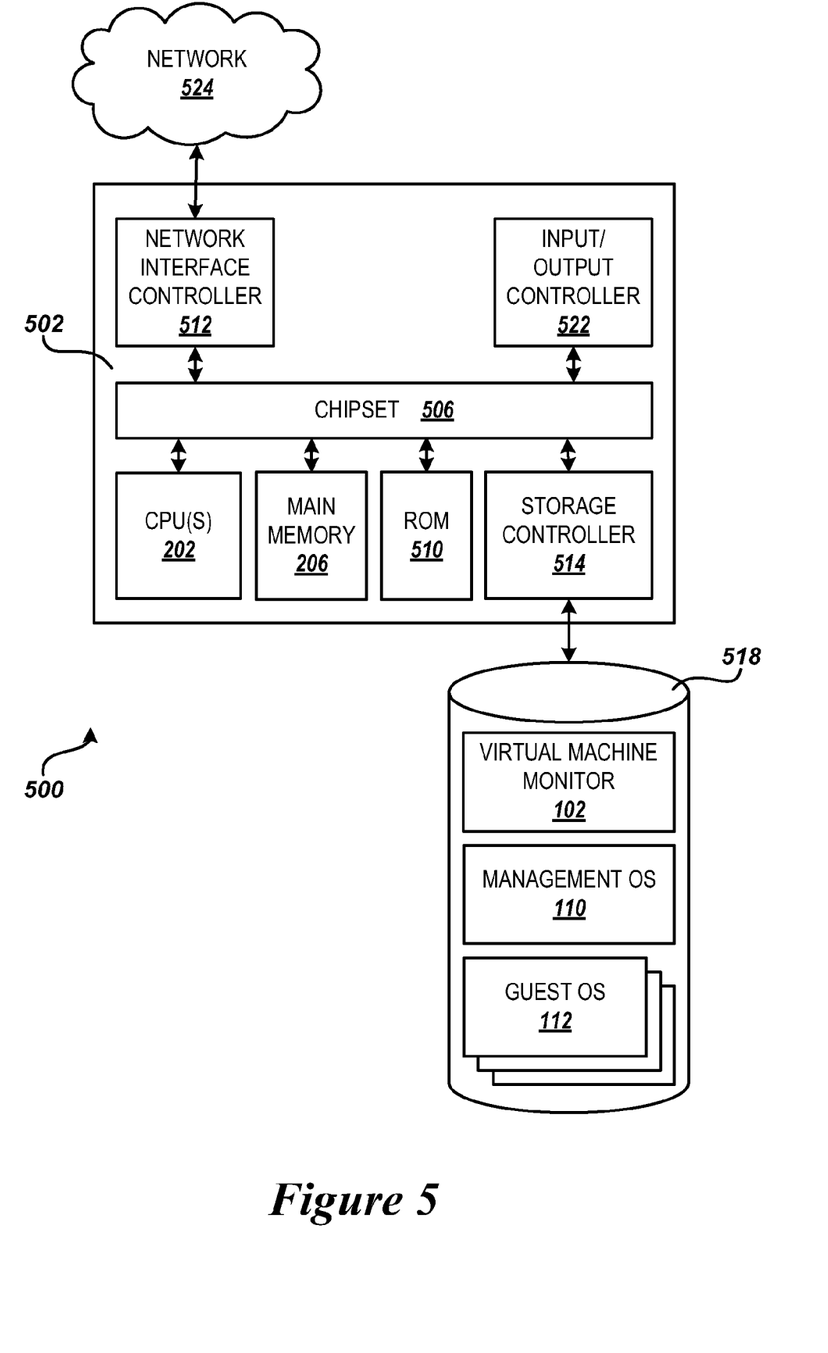
FIG. 5 is a computer architecture diagram showing an illustrative computer hardware architecture for computing devices described in embodiments presented herein.

FIG. 5 shows an example computer architecture 500 for a computer 502 capable of executing the software components described herein for regulating memory bandwidth usage in virtual machines via CPU scheduling, in the manner presented above. The computer architecture 500 shown in FIG. 5 illustrates a conventional server computer, workstation, desktop computer, laptop, personal digital assistant, cellular telephone device, electronic-book reader, special-purposed hardware device, network appliance, or other computing device, and may be utilized to execute any aspects of the software components presented herein described as executing on the host computer 104.

The computer 502 includes a baseboard, or "motherboard," which is a printed circuit board to which a multitude of components or devices may be connected by way of a system bus or other electrical communication paths. As discussed above in regard to FIG. 2, one or more single-core or multi-core CPUs 202 may operate in conjunction with a chipset 506. The CPUs 202 perform arithmetic and logical operations necessary for the operation of the computer 502 by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 506 provides an interface between the CPUs 202 and the remainder of the components and devices on or connected to the baseboard. For example, as further described above in regard to FIG. 2, the chipset 506 may implement the memory interface 208 between the CPUs 202 and the main memory 206 of the computer 502. The main memory 206 may be implemented in random access memory ("RAM"), static RAM ("SRAM"), dynamic RAM ("DRAM"), synchronous DRAM ("SDRAM"), or any type of volatile or non-volatile memory. The chipset 506 may further provide an interface to a computer-readable storage medium such as a read-only memory ("ROM") 510 or non-volatile RAM ("NVRAM") for storing basic routines that that help to startup the computer 502 and to transfer information between the various components and devices. The ROM 510 or NVRAM may also store other software components necessary for the operation of the computer 502 in accordance with the embodiments described herein, such as the VMM 102.

According to various embodiments, the computer 502 may operate in a networked environment using logical connections to remote computing devices and computer systems through a network 524. The chipset 506 includes functionality for providing network connectivity through a network interface controller ("NIC") 512, such as a gigabit Ethernet adapter. The NIC 512 is capable of connecting the computer 502 to other computing devices over the network 524. It should be appreciated that any number of NICs 512 may be present in the computer 502, connecting the computer to other types of networks and remote computer systems.

The computer 502 may be connected to a mass storage device 518 that provides non-volatile storage for the computer. The mass storage device 518 may store system programs, application programs, other program modules, and data, which are described in greater detail herein. The mass storage device 518 may be connected to the computer 502 through a storage controller 514 connected to the chipset 506. The mass storage device 518 may consist of one or more physical storage units. The storage controller 514 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 502 may store data on the mass storage device 518 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 518 is characterized as primary or secondary storage, and the like. For example, the computer 502 may store information to the mass storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 502 may further read information from the mass storage device 518 by detecting the physical states or characteristics of one or more particular locations within the physical storage units.

In addition to the mass storage device 518 described above, the computer 502 may have access to other computer-readable storage medium to store and retrieve information, such as program modules, data structures, or other data. It should be appreciated by those skilled in the art that computer-readable storage media can be any available media that may be accessed by the computer 502. By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information.

The mass storage device 518 may store software program executed on the computer 502, such as the VMM 102, the management OS 110, and the guest OSs 112, each of which was describe above in regard to FIG. 1. The mass storage device 518 may further store other system or application programs and data utilized by the computer 502. In one embodiment, the mass storage device 518 or other computer-readable storage media may be encoded with computer-executable instructions that, when loaded into the computer 502, may transform the computer from a general-purpose computing system into a special-purpose computer capable of implementing the embodiments described herein. These computer-executable instructions transform the computer 502 by specifying how the CPUs 202 transition between states, as described above. According to embodiments, the computer 502 may have access to computer-readable storage media storing computer-executable instructions that, when executed by the computer, perform the routines 300 and 400 for regulating memory bandwidth usage in virtual machines via CPU scheduling, as described above in regard to FIGS. 3 and 4.

The computer 502 may also include an input/output controller 522 for receiving and processing input from a number of input devices 524, such as the mouse, a keyboard, a touchpad, a touch screen, an electronic stylus, or other type of input device. Similarly, the input/output controller 522 may provide output to the display, such as a computer monitor, a flat-panel display, a digital projector, a printer, a plotter, or other type of output device. It will be appreciated that the computer 502 may not include all of the components shown in FIG. 5, may include other components that are not explicitly shown in FIG. 5, or may utilize an architecture completely different than that shown in FIG. 5.

Based on the foregoing, it should be appreciated that technologies for regulating memory bandwidth usage in virtual machines via CPU scheduling are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereon that, when executed by a computer, cause the computer to:

establish a counter to count cache-misses occurring on a processor of the computer; count a number of cache-misses that occur during a time slice of execution of a virtual machine on the processor, wherein the time slice of execution of the virtual machine is allocated to the virtual machine based upon a priority assigned to the virtual machine, a number of credits issued to the virtual machine, and a CPU-scheduling algorithm for the processor; and in response to detecting that the number of cache-misses that occur during the allocated time slice of execution of the virtual machine exceed a quota of cache-misses allotted to the virtual machine and receiving an interrupt generated by the counter, penalize the virtual machine by preemptively ending the execution of the virtual machine within the allocated time slice on the processor in favor of a next virtual machine scheduled to be executed after the allocated time slice of the execution of the virtual machine according to the CPU-scheduling algorithm for the processor, so that the virtual machine will receive less execution time with the processor without decrementing the priority assigned to the virtual machine, thereby reducing an adverse impact of the virtual machine on a performance of other virtual machines, including the next scheduled virtual machine, executing on the computer.

2. The computer-readable storage medium of claim 1, wherein establishing the counter to count cache-misses occurring on the processor comprises programming a hardware performance counter of the processor to count the number of cache-misses in the processor and to generate the interrupt when the quota of cache-misses has been exceeded.

3. A computer-implemented method for regulating memory bandwidth usage in a host computer, the method comprising executing instructions on the host computer to perform the operations of:
maintaining a single counter to count cache-misses caused by a plurality of virtual machines executing in a processor of the host computer;
detecting excessive memory bandwidth usage based on the single counter by detecting that a specific number of cache-misses has occurred in the processor during a time slice of execution of each virtual machine of the plurality of virtual machines on the processor, wherein the time slice of execution of the each virtual machine is allocated to the each virtual machine based upon a priority assigned to the each virtual machine, a number of credits issued to the each virtual machine, and a CPU-scheduling algorithm for the processor;
in response to detecting that the specific number of cache-misses has occurred in the processor and receiving an interrupt generated by the single counter, penalizing the virtual machine that is currently executing on the processor, wherein the virtual machine has an originally assigned priority that defines an original amount of execution time with the processor in accordance with the CPU-scheduling algorithm, and wherein the virtual machine is penalized by decrementing the virtual machine from the originally assigned priority to a lower priority so that the virtual machine will be allocated less execution time with the processor; and
periodically resetting, after penalizing the virtual machine, the lower priority of the virtual machine to the originally assigned priority so as to restore the virtual machine to having the original amount of execution time with the processor.

4. The computer-implemented method of claim 3, wherein maintaining the single counter to count cache-misses in the processor and detecting that the specific number of cache-misses has occurred comprises utilizing a hardware performance counter of the processor to count the number of cache-misses in the processor and to generate the interrupt when the specific number of cache-misses has occurred.

5. The computer-implemented method of claim 3, wherein the virtual machine then executing on the processor is penalized on each subsequent occurrence of the specific number of cache-misses on the processor.

6. A non-transitory computer-readable storage medium having computer-executable instructions stored thereon that, when executed by a computer, cause the computer to:
maintain a single counter to count cache-misses in a processor of the computer caused by a plurality of programs executing on the processor;
detect based on the single counter that a specific number of cache-misses has occurred in the processor during a time slice of execution of each program of the plurality of programs on the processor, wherein the time slice of execution of the each program is allocated to the each program based upon a priority assigned to the each program, a number of credits issued to the each program, and a CPU-scheduling algorithm for the processor;
in response to detecting that the specific number of cache-misses has occurred in the processor and receive an interrupt generated by the single counter, penalize the program that is currently executing on the processor by decrementing the program from an originally assigned priority, which defines an original amount of execution time with the processor in accordance with the CPU-scheduling algorithm, to a lower priority within the CPU-scheduling algorithm so that the program is allocated less execution time with the processor, wherein the program is executing in a virtual machine and is one of a plurality of programs executing concurrently on the computer; and
periodically resetting, after penalizing the program, the lower priority of the program to the originally assigned priority.

7. The computer-readable storage medium of claim 6, wherein maintaining the single counter to count cache-misses in the processor and detecting that the specific number of cache-misses has occurred comprises utilizing a hardware performance counter of the processor to count the number of cache-misses in the processor and to generate the interrupt when the specific number of cache-misses has occurred.

8. The computer-readable storage medium of claim 6, wherein one of the plurality of programs then executing on the processor is penalized on each subsequent occurrence of the specific number of cache-misses on the processor.

9. The computer-readable storage medium of claim 6, wherein the computer is a multi-processor computer.

10. The computer-readable storage medium of claim 6, wherein the program is a guest operating system hosted in the virtual machine.

11. A computer-implemented method for regulating shared memory bandwidth usage in a computer system, the method comprising executing instructions on the computer system to perform the operations of:
establishing a counter to count cache-misses occurring on a processor of the computer system;
counting a number of cache-misses that occur during a time slice of execution of a program on the processor;
detecting excessive memory bandwidth usage based on the counter by detecting that a specific number of cache-misses has occurred on the processor; and
in response to detecting that the number of cache-misses that occur during the allocated time slice of execution of the program exceed a quota of cache-misses allotted to the program and receiving an interrupt generated by the counter, penalizing the program by preemptively ending a current executing time slice for the program on the processor in favor of a next program scheduled to be executed on the processor after the current allocated executing time slice for the program according to a CPU-scheduling algorithm for the processor, so that the program will receive less execution time with the processor without decrementing the priority assigned to the program, thereby reducing an adverse impact of the program on a performance of the plurality of programs executing concurrently on the computer system, wherein the program is executing in a virtual machine and is one of a plurality of programs executing concurrently in the computer system, wherein the current executing time slice for the program is allocated based upon a priority assigned to the program, a number of credits issued to the program, and the CPU-scheduling algorithm for the processor.

12. The computer-implemented method of claim 11, wherein detecting that the specific number of cache-misses has occurred comprises utilizing a hardware performance counter of the processor to count the number of cache-misses in the processor and to generate the interrupt when the specific number of cache-misses has occurred.

13. The computer-implemented method of claim 11, wherein one of the plurality of programs then executing on the processor is penalized on each subsequent occurrence of the specific number of cache-misses on the processor.

14. The computer-implemented method of claim 11, wherein a number of cache-misses are counted for the execution of the program on the processor, and the program is penalized if the number of cache-misses exceeds a quota of cache-misses allotted to the program.

15. A system for regulating memory bandwidth usage on a host computer, the system comprising:

a hardware performance counter of a processor in the host computer programmed to count a number of cache-misses caused by a plurality of virtual machines executing on the processor and to generate an interrupt when a specific number of cache-misses have occurred during a time slice of execution of each virtual machine of the plurality of virtual machines on the processor, wherein the time slice of execution of the each virtual machine is allocated to the each virtual machine based upon a priority assigned to the each virtual machine, a number of credits issued to the each virtual machine, and a CPU-scheduling algorithm for the processor; and a virtual machine monitor executing on the host computer and configured to detect excessive memory bandwidth usage that the specific number of cache-misses has occurred in the processor through receiving the interrupt generated by the hardware performance counter, and to penalize, based on detecting the excessive memory bandwidth usage, the virtual machine that is currently scheduled for execution on the processor, the virtual machine having an originally assigned priority, which defines an original amount of execution time with the processor in accordance with the CPU-scheduling algorithm, wherein the virtual machine is penalized by decrementing the virtual machine from the originally assigned priority to a lower priority within the CPU-scheduling algorithm so that the virtual machine will be allocated less execution time with the processor, and wherein the virtual machine monitor is further configured to periodically reset, after penalizing the virtual machine, the lower priority of the virtual machine to the originally assigned priority.

16. The system of claim 15, wherein the hardware performance counter is programmed to generate the interrupt on each subsequent occurrence of the specific number of cache-misses on the processor and the virtual machine monitor is further configured to penalize the then executing virtual machine upon receiving each interrupt.

* * * * *